Sept. 28, 1937.  A. LAUB  2,094,298
CHANGE SPEED GEAR
Filed Aug. 3, 1936
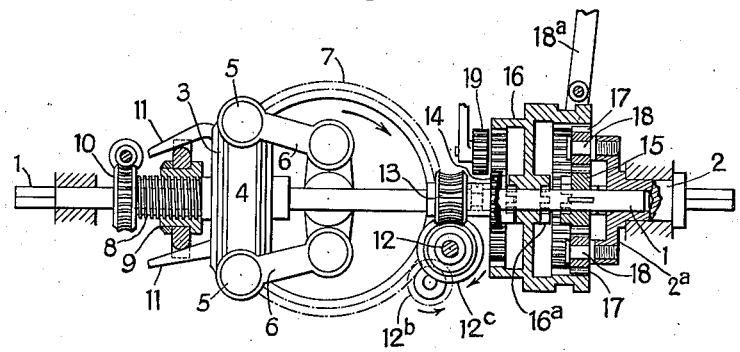
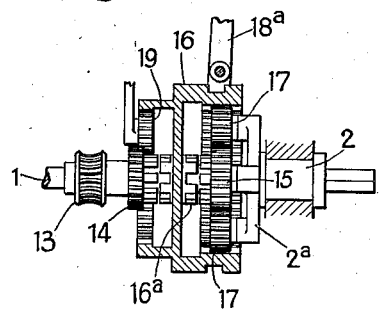
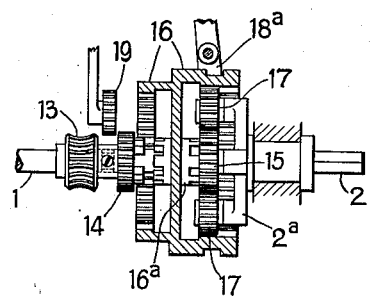
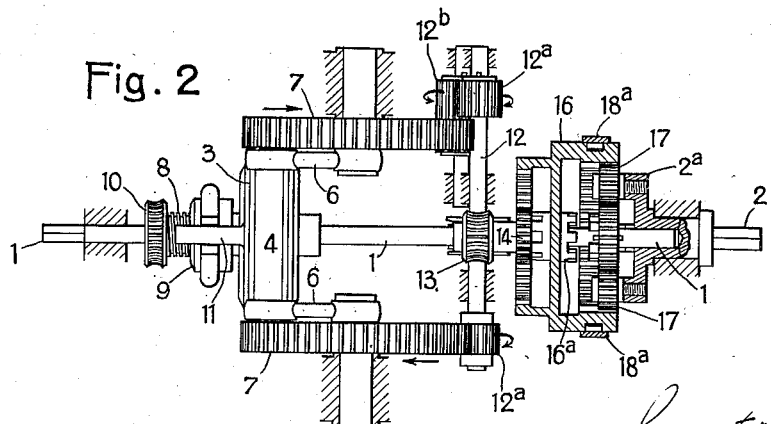
Inventor:
A. Laub
By E. F. Wenderoth
Atty Patented Sept. 28, 1937

2,094,298

UNITED STATES PATENT OFFICE 2,094,298

CHANGE SPEED GEAR

Adolf Laub, Basel, Switzerland, assignor to Hans Scheidegger, Laufen, Switzerland Application August 3, 1936, Serial No. 94,093
In Switzerland August 7, 1935

5 Claims. (Cl. 74—283)

Various change speed gears are already known in which the rotation of a driving shaft is transmitted to a driven shaft by means of a swash plate and a connecting mechanism working on the driving shaft in dependence of the tilt of the swash plate with respect to the shaft. All these gears have however been found more or less unsatisfactory in use. Apart from the fact that many of them are of complicated construction, they have the disadvantage that they only operate in one direction, that is to say transmission of power can only take place from the driving to the driven shaft. This is a very great disadvantage in the use of such gears on motor vehicles, because for example in running down hill the engine cannot be used to brake the vehicle.

The present invention relates to a change speed gear of the above stated type, which is capable to satisfy all the requirements of practice. This change speed gear comprises an annular motion transmitting or rotary member loose upon the driving shaft, which member can be brought into coupling connection with the said connecting mechanism, and further means for preventing movement of the rotary member when in this coupling position and thereby also of the internal teeth of a planetary gear serving to transmit the rotation of the driving shaft to the driven shaft, in the opposite direction to the driving movement imparted to the rotary member when the connecting mechanism is put into operation, in such a manner that with the driving shaft rotating the rotation thereof is transmitted to the driven shaft by means of a wheel fast upon the driving shaft and forming the sun wheel of the said planetary gear and of the internal teeth cooperating with the said sun wheel and prevented from rotating in the above indicated direction by the said means.

An example embodying the invention is shown in the accompanying drawing.

Figure 1 is a vertical section of the change speed gear,

Figure 2 is a plan view of Figure 1, certain parts being shown in section, and

Figures 3 and 4 are two vertical sections of the rear part of the gear in two different coupling positions.

In the figures, 1 indicates the driving shaft of the change speed gear, which as can be seen in Figures 1 and 2 extends through the whole gear, and 2 indicates the driven shaft whose particular construction is described below. On the driving shaft 1 is a swash plate 3 adjustable in its tilt on the shaft 1, which plate is provided in a groove in its periphery with a sliding ring 4. Connecting rods 6 are pivoted on pins 5 thereon. Two relatively large gear wheels 7, provided with roller ratchets not shown, are given driving impulses in opposite directions (see Figure 2) when the rotating swash plate 3 is set tilted. The construction of the connecting mechanism so far described is in itself known and fully described in my Patent 1,733,024 and it is therefore unnecessary to go into further detail. The tilting of the swash plate 3 can be varied as desired from outside by a suitable control mechanism. This mechanism comprises a control body 9 on a hollow screw spindle 8, which is moved along when the spindle 8 is turned by a worm gear 10 connected to it. This results in two inclined arms 11 on the swash plate 3, which engage slidably in suitable notches in the periphery of the control body, being swung up or down and the swash plate 3 being set at a corresponding tilt to the shaft according to the direction of movement of the body 9. The wheels 7 are in driving connection with a wormshaft 12 set transversely to the driving shaft 1. At its respective ends, shaft 12 carries two toothed wheels 12$^a$, of which one is in direct mesh with the corresponding wheel 7, while the other is in indirect mesh with the corresponding wheel 7 through an intermediate wheel 12$^b$.

By means of the toothed wheel gearing just described the successive driving impulses received from the wheels 7 result in a continuous rotation of the worm shaft 12. The worm 12$^c$ on the shaft 12 meshes with a worm wheel 13 loose upon the driving shaft 1, with which wheel 13 another toothed wheel 14 constructed at the same time as a dog clutch, is rigid. The driving shaft 1 also carries in addition to a keyed on wheel 15 which is also constructed at the same time as a dog clutch, a loose and slidably arranged annular motion transmitting or rotary member 16, which has a part 16$^a$ constructed as a dog clutch. The rotary member 16 further has two internally toothed parts of different breadths of which the broader is coupled to a toothed wheel 15 through planet wheels 17. The planet wheels are loose upon pins 17 of a multiarmed spider 2$^a$ fast on the driven shaft 2. The shaft 2 is at the same time constructed, as Figure 1 shows, as a bearing for the adjacent end of the driving shaft 1. A swingable operating fork 18$^a$ the free end of whose limbs engage in a groove in the periphery of the member 16 serves to slide the latter on the shaft 1. 19 indicates an intermediate toothed wheel slidable parallel with the shaft 1, which can be meshed simultaneously with the narrow internal teeth of member 16 and the wheel 14. The purpose of this intermediate wheel 19 is explained below.

The mode of operation of the above described gear is as follows:—

Assuming that with the swash plate 3 set perpendicular, the driving shaft 1 is being rotated by some motor not shown and that the rotary member 16 has been moved out of its mid or neutral position by being slid to the left to the position shown in Figure 1, by means of the operating fork 18ᵃ. The wheel 15 now transmits its rotation to the planet wheels 17 which, since the member 16 which in this position is in engagement with the dog clutch part of the wheel 14 and is therefore locked owing to the self-locking action of the worm gear 12ᶜ, 13, are caused to roll within the internal teeth with which they mesh, which results in the shaft 2 being set in rotation at a reduced speed corresponding to the ratio of reduction for which the planet gear is designed. The swash plate 3 is now gradually tilted more and more with respect to the shaft 1 by means of the control mechanism 8, 10, whereby the rotary member 16 is given a gradually increasing speed through the worm gear 12ᶜ, 13 driven in the above described manner, the rolling motion of the planet wheels 17 taking part in this movement of the member 16. This results in the shaft 2 being given a corresponding additional speed. When the speed of the member 16 equals that of the driving shaft 1, the member 16 is slid to the right from the position shown in Figure 1 by means of the fork 18ᵃ and brought into the position of Figure 3 in which the dog clutch part 16ᵃ, of member 16 meshes with the dogs on the wheel 15.

Direct drive is thus established and the connecting mechanism which by tilting the swash plate 3 and with the coaction of the worm gear 12ᶜ, 13 effected the gradual increase in the original starting speed of the shaft 2 can again be put out of action by restoring the swash plate 3 to its original position perpendicular to the shaft 1 by means of the control mechanism 8, 10.

In practice it is advantageous, in order to make the control of the gear as simple as possible, to interlock the control member which slides the rotary member 16 with the adjustment of the swash plate 3 in such a way that both members, that is the swash plate and rotary member, are moved in proper relationship for correct functioning of the gear.

The position of the parts for reverse drive is shown in Figure 4. The rotating member 16, as can be seen in that figure, is in its mid or neutral position, that is in a position in which it is not clutched either to the wheel 14 or the wheel 15. With the driving shaft 1 rotating the member 16 is set in rotation in reverse direction at a speed depending on that of the shaft 1. The swash plate 3 is now tilted so far that if the intermediate wheel is brought into mesh as shown in Figure 4, the member 16 is given an additional speed of rotation in that direction in which it is already rotating, by the wheel 14 which is rotating in the same direction as the wheel 15. This additional rotation imparted to the member 16 results in the planet wheels 17 being compelled to roll on the teeth of wheel 15 in the opposite direction to the rotation of the latter, which results in the shaft 2 rotating in the opposite direction to shaft 1.

For the particular case of use of the described change speed gear in motor vehicles, the main advantages of the gear are as follows:

(1) When forward gear is engaged (Figure 1) the driven shaft is not started from zero speed upwards, but directly with a definite starting speed depending on the ratio of the planetary gear. This is of importance in starting the vehicle.

(2) The connecting mechanism is used primarily to increase the starting speed of the driven shaft; it is not subjected to the heavy stresses of starting the vehicle which is advantageous as regards its dimensions.

(3) The braking effect of the engine can be fully used, for example in running down hill, and not only in direct gear, but by engaging the reverse gear (Figure 4) also with a setting of the connecting mechanism for a reduced speed depending on the amount of tilting of the swash plate.

What I claim is:—

1. A change speed gear comprising a driving shaft, a driven shaft, a sun wheel coaxial with said driven shaft and in driving connection with said driving shaft, an internally toothed annular member free to rotate coaxially about said sun wheel, a planet carrier arranged between the driven shaft and the driving shaft, planetary wheels on said carrier meshing with said sun wheel and the internal teeth of said annular member, a swash plate on said driving shaft, controllable means for adjusting the tilt of said swash plate, a clutch member, means for ensuring in combination with the planetary gearing the transmission of drive motion in the forward direction, in dependence on the tilt of said swash plate, from said swash plate to said clutch member, and means for positively coupling said annular member to said clutch member.

2. A change speed gear according to claim 1 also comprising controllable means for uncoupling said annular member from said clutch member and for positively coupling it with said sun wheel.

3. A change speed gear according to claim 1 also comprising controllable means for uncoupling said annular member from said clutch member, and other controllable means adapted to rotate said annular member from and in the opposite direction to said clutch member.

4. A change speed gear according to claim 1 also comprising controllable means for uncoupling said annular member from said clutch member, controllable means for coupling said annular member positively to said sun wheel, and other controllable means adapted to rotate said annular member from and in the opposite direction to said clutch member.

5. A change speed gear comprising a driving shaft, a driven shaft in alignment therewith, a sun wheel fast on said driving shaft, a planet carrier arranged between the driving shaft and the driven shaft, planet wheels on said carrier meshing with said sun wheel, dog clutch teeth on said sun wheel, a dog clutch member loose on said driving shaft, adjustable swash plate mechanism actuating said dog clutch member, a motion transmitting member loose on said driving shaft, controllable means for positively clutching said motion transmitting member alternatively to said sun wheel and to said dog clutch member, and internal teeth in said motion transmitting member permanently meshing with said planet wheels.

ADOLF LAUB.